(12) United States Patent
Secondari

(10) Patent No.: US 6,267,166 B1
(45) Date of Patent: Jul. 31, 2001

(54) RADIAL TIRE WITH ASYMMETRIC CONSTRUCTION

(75) Inventor: Francesco Secondari, Madison, AL (US)

(73) Assignee: Dunlop Tire Corporation, Buffalo, NY (US)

( * ) Notice: Subject to any disclaimer, the term of this patent is extended or adjusted under 35 U.S.C. 154(b) by 0 days.

(21) Appl. No.: 09/314,015

(22) Filed: May 19, 1999

(51) Int. Cl.⁷ ................................................. B60C 9/17
(52) U.S. Cl. .................... 152/455; 152/551; 152/554; 152/561
(58) Field of Search .................... 152/455, 456, 152/552, 551, 554, 561

(56) References Cited

U.S. PATENT DOCUMENTS

| | | | |
|---|---|---|---|
| 3,286,758 | * 11/1966 | Svereckis et al. | 152/554 |
| 3,339,610 | * 9/1967 | Fausti et al. | 152/455 |
| 3,506,052 | * 4/1970 | Wittneben | 152/552 |

* cited by examiner

*Primary Examiner*—Geoffrey L. Knable

(57) ABSTRACT

A pneumatic tire having an inboard sidewall and an outboard sidewall when fitted to a vehicle including a reinforced carcass extending between bead regions through both inboard and outboard sidewalls and a tread region reinforced by a breaker extending between the tread edges beneath the rubber tread wherein the carcass in the outboard sidewall comprises a single ply of reinforced material having mutually parallel reinforcement cords extending substantially radially of the tire, the ply having one edge located under the breaker, extending from the breaker radially inwards through the outboard sidewall and being wrapped axially outwards around a bead hoop and being turned up to have its second edge radially outwards of the bead hoop, and the reinforced carcass for the inboard sidewall comprises a single ply of reinforcement material arranged with a first edge under and in overlapping engagement with the edge region of the outboard sidewall reinforcement, said first edge being adjacent to the inboard bead at an inboard shoulder, the single ply of the inboard side wall having a main portion extending radially inwards and a turn-up portion being wrapped around the inboard bead from inside to outside and extending radially outwards through the inboard sidewall to a point adjacent to an inboard breaker edge radially under said breaker and radially over the outboard sidewall ply in overlapping arrangement therewith.

7 Claims, 1 Drawing Sheet

RADIAL TIRE WITH ASYMMETRIC CONSTRUCTION

Figure 1:
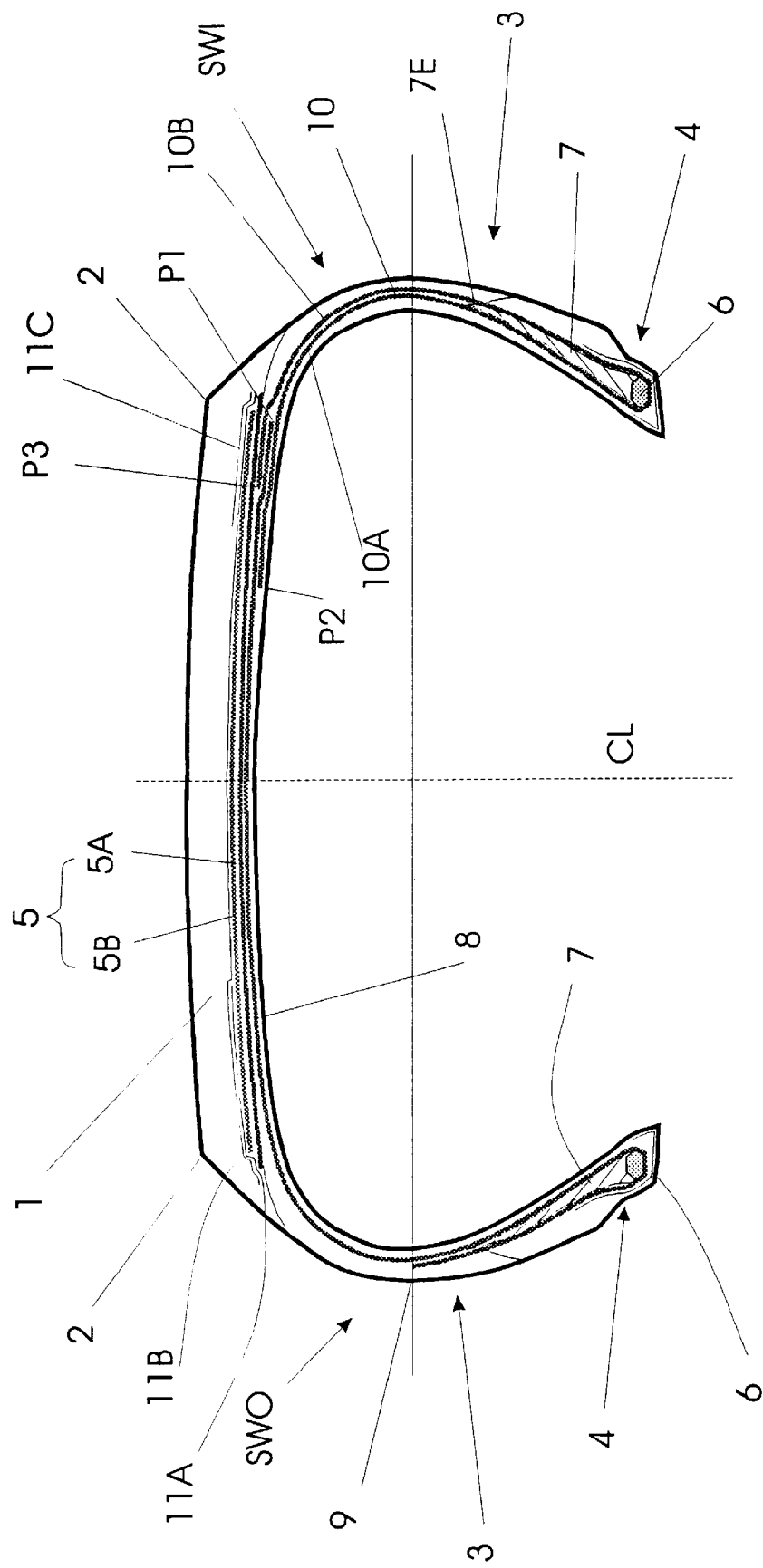

The present invention relates to pneumatic tires and particularly to radial tires with an asymmetric carcass construction. More particularly it relates to such a tire with improved handling properties.

Conventional radial tires of symmetric construction use the same reinforcements in either sidewall. To provide good handling properties tires have become progressively stiffer. It is also conventionally considered that the sidewall primarily affecting handling when the tire is fitted to a vehicle is the sidewall which is outboard of the vehicle.

Tires having stiff sidewalls on the outboard and softer or more flexible sidewalls on the inboard when fitted to the vehicle have been suggested to give good handling and in combination good comfort. Some such tires however have not been successful and all tires having stiff outboard sidewalls giving good handling are prone to uneven wear particularly in mixed use.

It is an object of the present invention to overcome the above problem and provide a tire having good handling and even wear.

According to the present invention a pneumatic tire having an inboard sidewall and an outboard sidewall for fitting to a vehicle comprises a reinforced carcass extending between bead regions through both inboard and outboard sidewalls and a tread region reinforced by a breaker reinforcement extending between the tread edges beneath the rubber tread wherein the carcass in the outboard sidewall comprises a single ply of reinforced material having mutually parallel reinforcement cords extending substantially radially of the tire, the ply having one edge located under the breaker, extending from the breaker package radially inwards through the outboard sidewall and being wrapped axially outwards around the bead hoop and being turned up to have its second edge radially outwards of the bead hoop and the carcass reinforcement for the inboard sidewall comprises a single ply of reinforcement material arranged with a first edge under and in overlapping engagement with the edge region of the outboard sidewall reinforcement adjacent to the inboard bead, the single ply extending radially inwards and being wrapped around the inboard bead from inside to outside and extending radially outwards through the inboard sidewall to a point adjacent to the inboard breaker edge radially under said breaker and radially over the outboard sidewall ply in overlapping arrangement therewith.

Further aspects of the present invention will become apparent from the following description by way of example only of one embodiment in conjunction with the attached diagrammatic drawing, in which:

FIG. 1 shows a schematic cross-section diagram of a tire according to the present invention.

The tire shown in FIG. 1 is a P245/50R16 passenger car tire. It has a ground contacting tread 1 extending between tread edges 2 connected to radially inwardly extending sidewalls 3 terminating in bead regions 4 for mounting on a wheel rim not shown.

The tread is reinforced by a belt or breaker assembly 5 comprising two centrally disposed plies 5A and 5B. The breaker assembly has a nominal width of 232 mm whilst the tire section width is 274 mm. Both of the breaker plies comprise a plurality of steel cords disposed in parallel arrangement at an angle of 23° to the tire's circumferential direction and crossed with respect to the cords of the other ply.

Each bead region 4 is reinforced by an in extensible bead hoop 6 comprising a plurality of turns of steel wire. Above each bead hoop 6 is a bead apex 7 which extends radially outwards of the tire.

The tire shown is designed especially for fitting to a vehicle with the left-hand sidewall SWO outboard of the vehicle and the right-hand sidewall SWI inboard of the vehicle. It should be noted that both sidewalls have different constructions.

The outboard sidewall SWO (as shown on the left-hand side of FIG. 1) is basically of conventional construction. A monoply carcass reinforcement 8 extends from the center-line CL of the tire under the breaker radially through the sidewall 3 and is wrapped from the inside to the outside around the bead core 6 and turned up to the mid-sidewall point 9 as shown. The carcass reinforcement 8 comprises a plurality of reinforcing cords or elements laid substantially at 85°–90° to the tire circumferential direction. Thus the construction of the outboard sidewall is that of a monoply radial tire.

The turned-up edge may be positioned at any height above the bead hoop up to the mid-sidewall point even up to the top of the sidewall.

The other sidewall SWI which is meant for mounting inboard of the vehicle comprising an entirely unconventional construction. Firstly it should be noted that the carcass reinforcement 8 of the outboard sidewall SWO terminates in the shoulder region of the inboard sidewall at a point P1. The inboard carcass reinforcement 10 comprises a carcass ply 10A and a turned-up outer carcass ply 10B both of which terminate in the edge region ER of the tread region. Thus the sidewall reinforcing carcass 10 comprises an inner ply 10A and an outer ply 10B with a wrap from the inside to the outside around the bead core 6 and 10A and 10B either side of the apex 7. Above the apex top edge 7E the two plies 10A and 10B run closely together.

As can be seen in the drawing the inner ply 10A begins at a point P2 which is a ply start distance which is 60 mm inboard of the breaker edge and the turn-up outer ply 10B terminates at a point P3 which is a ply end distance 12 which is 30 mm inboard of the breaker edge. It should be noted that the outer ply 10B overlaps the edge of the outboard ply reinforcement 8, i.e. point P1, by a distance of 20 mm. The resultant construction has sufficient overlap for the inboard side carcass reinforcement 10 to be in full engagement with and bonded to the outboard carcass reinforcement 8 and all bonded edges are underneath the breaker package.

The inboard carcass ply 10 is reinforced by cords which are laid to lie at an angle different to 90° with plies 10A and 10B substantially at 70°–75°; to the circumferential direction so that the inboard sidewall is reinforced by plies which cross at an angle thus making the sidewall stiff.

Cord angles of 30°–85° can be used although 70°–85° is preferred.

The tire construction is completed by a bandage covering the full width of the breaker package 5. At the left-hand side as shown, i.e. at the outer sidewall SWO region, the bandage comprises a strip wound around the tire circumferentially having a width 60 mm. A full width bandage ply 11B extending circumferentially around the tire is applied over the outboard edge strip 11A. Finally a 60 mm wide edge strip 11C is wrapped circumferentially around the tire adjacent to the inboard sidewall edge of the breaker package. Thus the breaker package comprises a full width ply and a 60 mm wide edge strip at each side of the tire tread region.

The resultant tire has an inboard sidewall SW1 which is substantially stiffer than the outboard sidewall SWO and it has been found when fitted to a vehicle that the overall tire has improved normal handling, improved handling at the limit and is of approximately 10% less weight than a conventional tire of the same dimensions. Finally the tire is found to wear evenly even when used in heavy duty conditions which is quite different from the normal good handling radial tire constructions where the outboard sidewall is stiffened or both sidewalls are stiffened.

What is claimed is:

1. A pneumatic tire having an inboard sidewall and an outboard sidewall when fitted to a vehicle comprising a reinforced carcass extending between bead regions through both inboard and outboard sidewalls and a tread region reinforced by a breaker extending between the tread edges beneath the rubber tread wherein the carcass in the outboard sidewall comprises a single ply of reinforced material having mutually parallel reinforcement cords extending substantially radially of the tire, the ply having one edge located under the breaker, extending from the breaker radially inwards through the outboard sidewall and being wrapped axially outwards around a bead hoop and being turned up to have its second edge radially outwards of the bead hoop, and the reinforced carcass for the inboard sidewall comprises a single ply of reinforcement material arranged with a first edge under and in overlapping engagement with the edge region of the outboard sidewall reinforcement, said first edge being adjacent to the inboard bead at an inboard shoulder, the single ply of the inboard side wall having a main portion extending radially inwards and a turn-up portion being wrapped around the inboard bead from inside to outside and extending radially outwards through the inboard sidewall to a point adjacent to an inboard breaker edge radially under said breaker and radially over the outboard sidewall ply in overlapping arrangement therewith, the overlap between both edges of the inboard sidewall reinforcement main portion and turn-up portion with the outboard sidewall reinforcement edge are in the range of 10%–20% of the width of the breaker.

2. A tire according to claim 1 wherein the one edge of the carcass reinforcement of the outboard sidewall is positioned substantially at the edge of the breaker at the inboard sidewall.

3. A tire according to claim 1, wherein the reinforcement cords in the inboard sidewall reinforcement lie in the range of 30° to 85° to the circumferential direction and the cords of the main and turned-up reinforcements are at opposite directions so that the cords of the respective reinforcements cross.

4. A tire according to claim 1, wherein the reinforcement cords in the inboard sidewall reinforcement lie in the range of 70° to 75° to the circumferential direction.

5. A tire according to claim 1 wherein the turned-up second edge of the outboard sidewall carcass is substantially at the mid-sidewall point.

6. A tire according to claim 1, wherein the breaker reinforcement has an overlying cap ply comprising a full width ply of reinforced fabric.

7. A tire according to claim 6, wherein an edge strip of 40–60 mm width which is reinforced by cords laid substantially parallel to the circumferential direction is positioned under the edge of the cap ply at the outboard side and a similar edge is positioned over the edge of the cap ply at the inboard edge.

* * * * *